United States Patent [19]
Shimizu et al.

[11] Patent Number: 6,000,491
[45] Date of Patent: Dec. 14, 1999

[54] ELECTRIC POWER STEERING APPARATUS HAVING STEERING TORQUE SENSOR INTEGRALLY ASSEMBLED IN STEERING DEVICE WITH VARIABLE STEERING RATIO

[75] Inventors: Yasuo Shimizu; Toshitake Kawai; Jyunji Yuzuriha, all of Wako, Japan

[73] Assignee: Honda Giken Kogyo Kabushiki Kaisha, Tokyo, Japan

[21] Appl. No.: 09/036,840

[22] Filed: Mar. 9, 1998

[30] Foreign Application Priority Data

Mar. 10, 1997 [JP] Japan ................................. 9-055293

[51] Int. Cl.⁶ ........................................ B62D 5/04
[52] U.S. Cl. ........................... 180/444; 180/446; 74/498; 74/571 M
[58] Field of Search ............................. 180/444, 446, 180/443; 74/498, 571 M

[56] References Cited

U.S. PATENT DOCUMENTS

| 5,489,004 | 2/1996 | Shimizu et al. | 180/400 |
| 5,650,701 | 7/1997 | Shimizu et al. | 318/489 |
| 5,836,419 | 11/1998 | Shimizu et al. | 180/443 |
| 5,906,250 | 5/1999 | Haga et al. | 180/444 |
| 5,924,519 | 7/1999 | Shimizu et al. | 180/444 |

FOREIGN PATENT DOCUMENTS

7-257406  10/1995  Japan.

*Primary Examiner*—J. J. Swann
*Assistant Examiner*—Andrew J. Ririe
*Attorney, Agent, or Firm*—Merchant & Gould P.C.

[57] ABSTRACT

An electric power steering apparatus includes a steering torque sensor assembled integrally with a steering device having a variable steering ratio. The steering device includes an input shaft eccentrically and rotatably mounted in a movable housing rotatably supported on a fixed housing, an output shaft rotatably mounted in the fixed housing in eccentric relation to the input shaft, a coupling relatively non-rotatably interconnecting the input and output shafts while allowing them to move relatively to one another in a perpendicular direction of axes of the input and output shafts, and a drive mechanism for rotating the movable housing relatively to the fixed housing to displace the input shaft relatively to an axis of the movable housing so that the eccentricity between the input and output shafts changes to vary the steering ratio of the steering device. The input shaft includes a first shaft connected to a steering wheel, a second shaft connected to the output shaft via the coupling, and a torsion bar connecting the first and second shafts while permitting relative torsional displacement between the first and second shafts. The steering torque sensor includes a slider engaged with the first and second shafts and axially displaceable in response to relative torsional displacement between the first and second shafts, and a coil attached to the movable housing for converting the amount of axial displacement of the slider into a corresponding electric signal.

7 Claims, 8 Drawing Sheets

ELECTRIC POWER STEERING APPARATUS HAVING STEERING TORQUE SENSOR INTEGRALLY ASSEMBLED IN STEERING DEVICE WITH VARIABLE STEERING RATIO

BACKGROUND OF THE INVENTION

1. Field of the Invention

The present invention relates generally to an electronic power steering apparatus for vehicles, and more particularly to improvements in an electric power steering apparatus having a steering device with variable steering ratio.

2. Description of the Related Art

In recent years, electric power steering apparatuses have been used extensively to reduce the manual steering effort or force needed to turn the steering wheel to thereby provide a comfortable steering touch to the driver. The electric power steering apparatuses of the type concerned are constructed such that an assist torque generated by an electric motor in proportion to the steering torque is transmitted to the steering system to reduce the manual steering force required by the driver.

Some known electric power steering apparatuses include a steering device or unit having a steering ratio (the number of 360° turns of the steering wheel that are required to swivel or pivot the front wheels all the way from left to right) which is variable in response to the vehicle velocity. One example of such electric power steering apparatuses is disclosed in Japanese Patent Laid-open Publication No. HEI 7-257406.

The disclosed steering device includes an input shaft connected to a steering wheel and rotatably supported by a support member in eccentric relation to the support member. The support member is rotated by a motor to displace the axis of the input shaft to thereby vary the eccentricity (eccentric distance) between the axis of the input shaft and the axis of an output shaft which transmits the steering force to the front wheels. With this varying eccentricity, the ratio of the rotational angle of the input shaft to the rotational angle of the output shaft, namely, the ratio (steering ratio) of the rotational angle of the steering wheel to the swivel angle of the front wheels is variable. Conventional electric power steering apparatuses in which the steering device is incorporated are generally constructed as follows.

Figure 8:
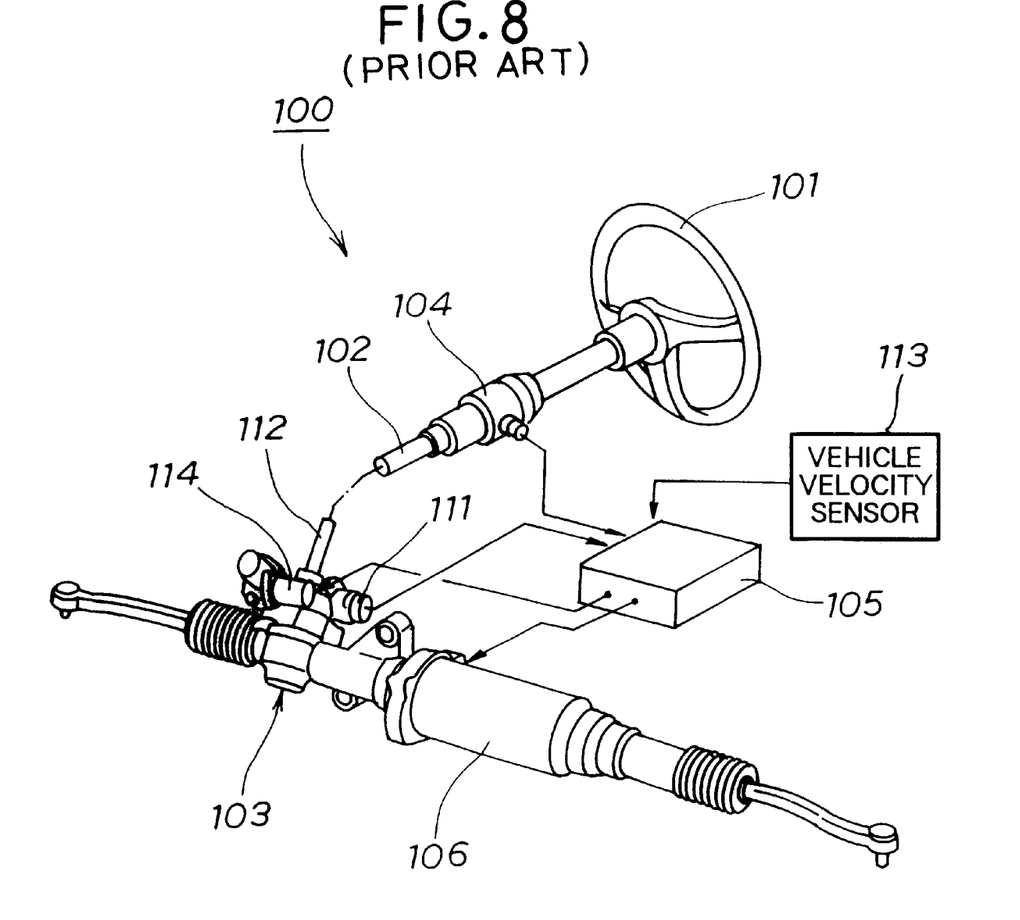
FIG. 8 is a pictorial perspective view showing the general arrangement of an electric power steering device having a steering device with variable steering ratio.

As shown in FIG. 8, the conventional electric power steering apparatus 100 includes a steering wheel 101 operatively connected via a steering shaft 102 and universal joints (not shown) to a rack-and-pinion mechanism (not shown) of a steering device or unit with variable steering ratio (corresponding to the steering device disclosed in the Japanese publication specified above). When the steering wheel 101 is actuated, a steering system produces a steering torque which is detected by a steering torque sensor 104. The steering torque sensor 104 generates a detection signal indicative of the steering torque and sends it to a control means or unit 105 which in turn generates a control signal. Based on the control signal, an electric motor 106 produces an assist torque proportional to the steering torque. The assist torque is applied to a rack of the rack-and-pinion mechanism. The torque sensor 104 is disposed around the steering shaft 102.

The control unit 105 also generates, on the basis of an eccentricity signal indicative of an eccentricity of the input shaft 112 detected by a displacement sensor 111 and a vehicle velocity signal indicative of a velocity of the vehicle detected by a vehicle velocity sensor 113, a steering ratio control signal responsive to the vehicle velocity. Based on the steering ratio signal, a steering ratio control motor 114 drives the steering device 103 to control the steering ratio of the steering device 103.

Because the steering device 103 and the steering torque sensor 104 are structurally independent from one another and provided at different positions spaced remotely from one another, the conventional electric power steering apparatus has various problems, as enumerated below.

(1) The steering torque senor 104 requires a performance test which is performed separately from a performance test of the steering device 103. Such a test process is tedious and time-consuming.

(2) The steering torque sensor 104 requires a separate assembling process additional to the one for assembling the steering device 103 with the vehicle body. The separate assembling process is tedious and time-consuming and also increases the assembling cost. These devices 103, 104 further require separate sets of harnesses which are uneasy to arrange or wire. Especially, because the harness of the steering torque sensor 104 is composed of relatively thin signal-line conductors, care must be taken not to damage or otherwise break any of the conductors during wiring operation. The wiring operation is, therefore, low in efficiency.

(3) The respective components of the steering device 103 and steering torque sensor 104 increase the number and cost of the parts used because they cannot be used in common regardless of the presence of a steering torque sensor provided around the steering shaft 102.

A consideration of the foregoing problem may lead one having ordinary skill to a concluding that the steering torque sensor 104 should preferably be incorporated in the steering device 103. However, a mere combination of these two components will encounter a difficulty because the steering torque sensor should be disposed around an input shaft of the steering device which is adapted to be displaced in a lateral direction.

SUMMARY OF THE INVENTION

It is accordingly an object of the present invention to provide an electric power steering apparatus which includes a steering torque sensor assembled integrally with a steering device having a variable steering ratio.

In brief, an electric power steering apparatus according to the present invention includes a steering torque sensor for detecting a steering torque of a steering system extending from a steering wheel to steerable wheels of a vehicle and generating an electric signal indicative of the detected steering torque, an electric motor for generating an assist torque on the basis of the electric signal and providing the assist torque to the steering system, and a steering device having a variable steering ratio represented by the number of degrees of the steering wheel that is required to pivot the steerable wheels one degree, wherein the steering torque sensor is assembled integrally with the steering device.

More specifically, the steering device includes a housing assembly composed of a fixed housing and a movable housing rotatably supported on the fixed housing, an input shaft operatively connected to the steering wheel and rotatably mounted in the movable housing in eccentric relation to the movable housing, an output shaft operatively connected to the steerable wheels and rotatably mounted in the fixed housing in eccentric relation to the input shaft, a coupling relatively non-rotatably connecting the input shaft and the output shaft while allowing them to move relatively to one another in a direction perpendicular to axes of the input and output shafts, and drive means for rotating the movable housing relative to the fixed housing to displace the axis of the input shaft relatively to an axis of rotation of the movable housing so that the eccentricity between the input shaft and the output shaft changes to vary the steering ratio of the steering device. The input shaft includes a first shaft connected to the steering wheel, a second shaft connected to the output shaft via the coupling, and a torsion bar interconnecting the first and second shafts while allowing them to create a relative torsional displacement therebetween. The steering torque sensor includes a slider movably engaged with the first and second shafts and displaceable in an axial direction in response to relative torsional displacement between the first and second shafts, and a coil mounted on the movable housing for converting the amount of axial displacement of the slider into a corresponding electric signal.

The first and second shafts connected together by the torsion bar are torsionally displaceable relatively to one another, and the amount of relative torsional displacement between the first and second shafts is detected by the steering torque sensor. Rotation of the movable housing causes the first shaft, torsion bar and second shaft (i.e., the input shaft) to displace together in a lateral direction (which is perpendicular to a common axis of the first shaft, torsion bar and second shaft). The coil of the steering torque sensor is disposed concentrically with the movable housing, and the steering torque sensor can, therefore, be assembled integrally with the steering device at a portion around the input shaft.

In one preferred form of the invention, the fixed housing has a circular opening, and the movable housing has a cylindrical outside surface received in the circular opening with an annular space defined between the fixed housing and the movable housing. The steering device further includes a seal member disposed in the annular space to form a hermetic seal between the fixed housing and the movable housing. Preferably, the movable housing includes a substantially annular member molded of synthetic resin, and a low friction metal ring molded integrally with an outer peripheral surface of the annular member and forming the cylindrical outside surface of the movable housing.

The drive means may include a worm gear mechanism composed of a worm gear and a worm wheel rotatably driven by the worm gear. In this instance, the movable housing preferably is a composite movable housing which is composed of a substantially annular first movable housing member of synthetic resin and a substantially annular second movable housing member of metal connected end to end with the annular first movable housing member in concentric relation to the latter. The worm wheel is toothed on a cylindrical outside surface of the second movable housing member, and the coil of the steering torque sensor is molded concentrically and integrally with the first movable housing member. The worm wheel toothed on the second movable housing member of metal is highly durable, while the coil molded integrally with the first movable housing member of synthetic resin can reduce assembling time and cost.

The coupling preferably includes a first coupling member formed integrally with the second shaft and having a first groove of V-shaped cross section extending along the direction specified above, a connecting shaft rotatably received in the axial hole in the first coupling member, a second coupling member formed integrally with an end of the connecting shaft and having a second groove of V-shaped cross section extending in confrontation with the first groove, and a plurality of balls slidably received in the first and second grooves to couple the first and second coupling members while allowing them to move relatively to one another in a direction along the first and second grooves.

The above and other object, features and advantages of the present invention will become manifest to those versed in the art upon making reference to the detailed description and accompanying sheets of drawings in which a preferred structural embodiment incorporating the principles of the present invention is shown by way of illustrative example.

DETAILED DESCRIPTION OF THE PREFERRED EMBODIMENT

Now, one preferred structural embodiment of the present invention will be described below in greater detail with reference to the accompanying drawings, wherein like reference characters designate like or corresponding parts throughout the several views.

An electric power steering apparatus of the present invention is structurally the same as the one shown in FIG. 8 but differs therefrom in that a steering torque sensor is assembled integrally with a steering device with variable steering ratio.

Figure 1:
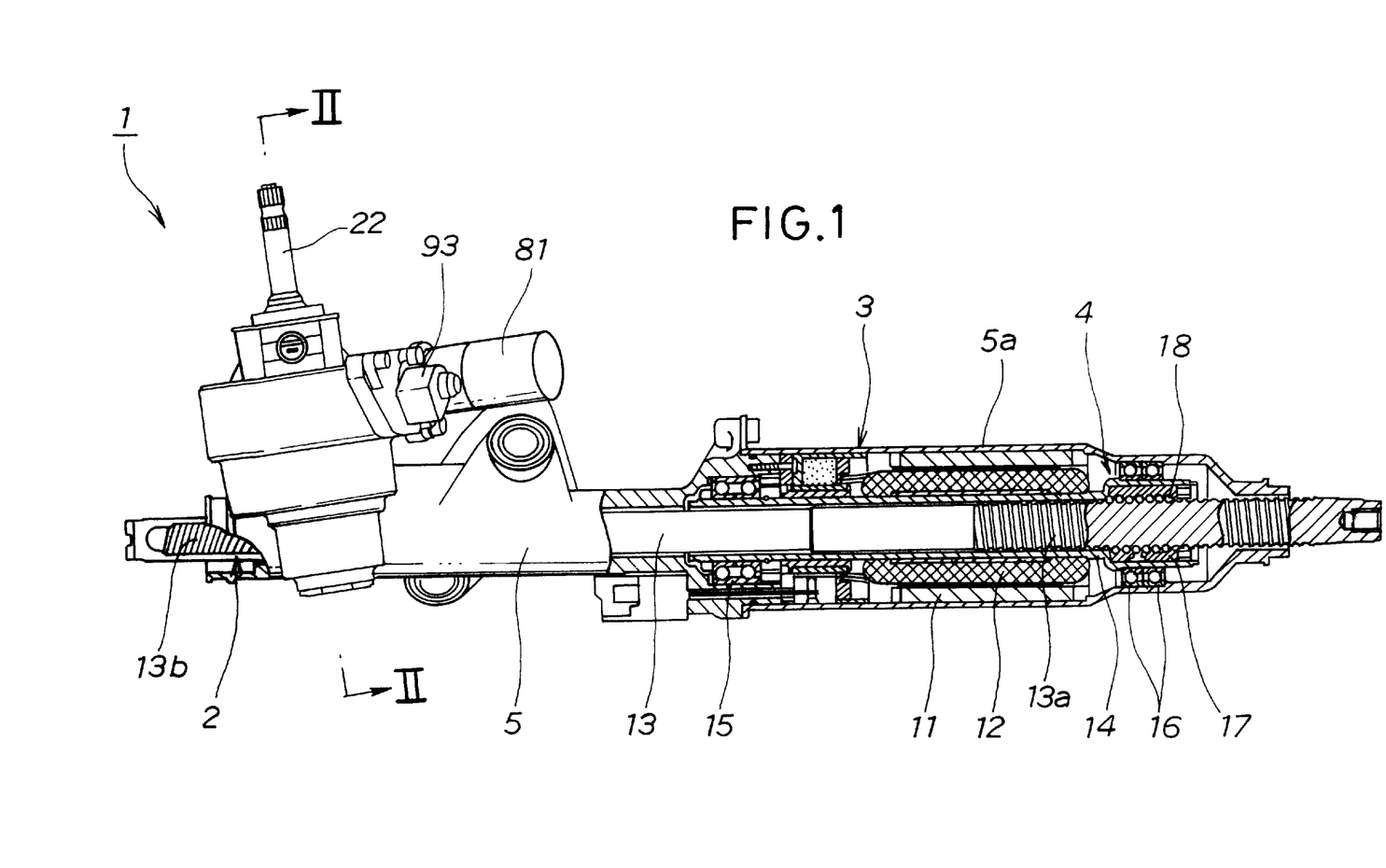
FIG. 1 is a diagrammatical front elevational view, with parts in cross section, of a steering device with variable steering ratio which forms part of an electric power steering apparatus according to the present invention.

FIG. 1 shows the general construction of the steering device 1 embodying the present invention. The steering device 1 generally includes a rack-and-pinion mechanism 2, an electric motor 3, and a ball-screw mechanism (also called "screw and nut mechanism") 4 that are received in a fixed housing 5 extending in parallel to a front axle of a motor vehicle. The fixed housing 5 has an auxiliary housing 5a.

The electric motor 3 includes a hollow cylindrical stator 11 received in and fixed to the auxiliary housing 5a, and a rotor 12 concentrically disposed in the stator 11. The rotor 12 has a tubular output shaft 14 through which a rack shaft 13 of the rack-and-pinion mechanism 2 extends for movement in both axial and circumferential directions relative to the output shaft 14. The output shaft 14 has opposite end portions rotatably supported by a double-row ball bearing 15 and duplex ball bearings 16, respectively. One end portion (right side in FIG. 1) of the output shaft 14 firmly retains therein a nut 17 of the ball-screw mechanism 4. The ball bearings 16 further support an intermediate portion of the ball-screw mechanism 4 via the output shaft 14.

The ball-screw mechanism 4 includes a screw portion 13a threaded on a cylindrical outside surface of the rack shaft 13, and the nut 17 threaded or engaged with the screw portion 13a with a plurality of steel balls 18 disposed therebetween. With this arrangement, a rotational motion of one of the screw portion 13a and the nut 17 is translated into an axial reciprocating motion of the other of the screw portion 13a and the nut 17. During operation of the ball-screw mechanism 4, the balls 18 move in succession from one end toward the other end of the nut 17. After their arrival to the other end, the balls 18 return to the one end of the nut 17 through a guide groove formed in the nut 17. The ball-screw mechanism 4 is known per se, and further description thereof can be omitted.

Figure 2:
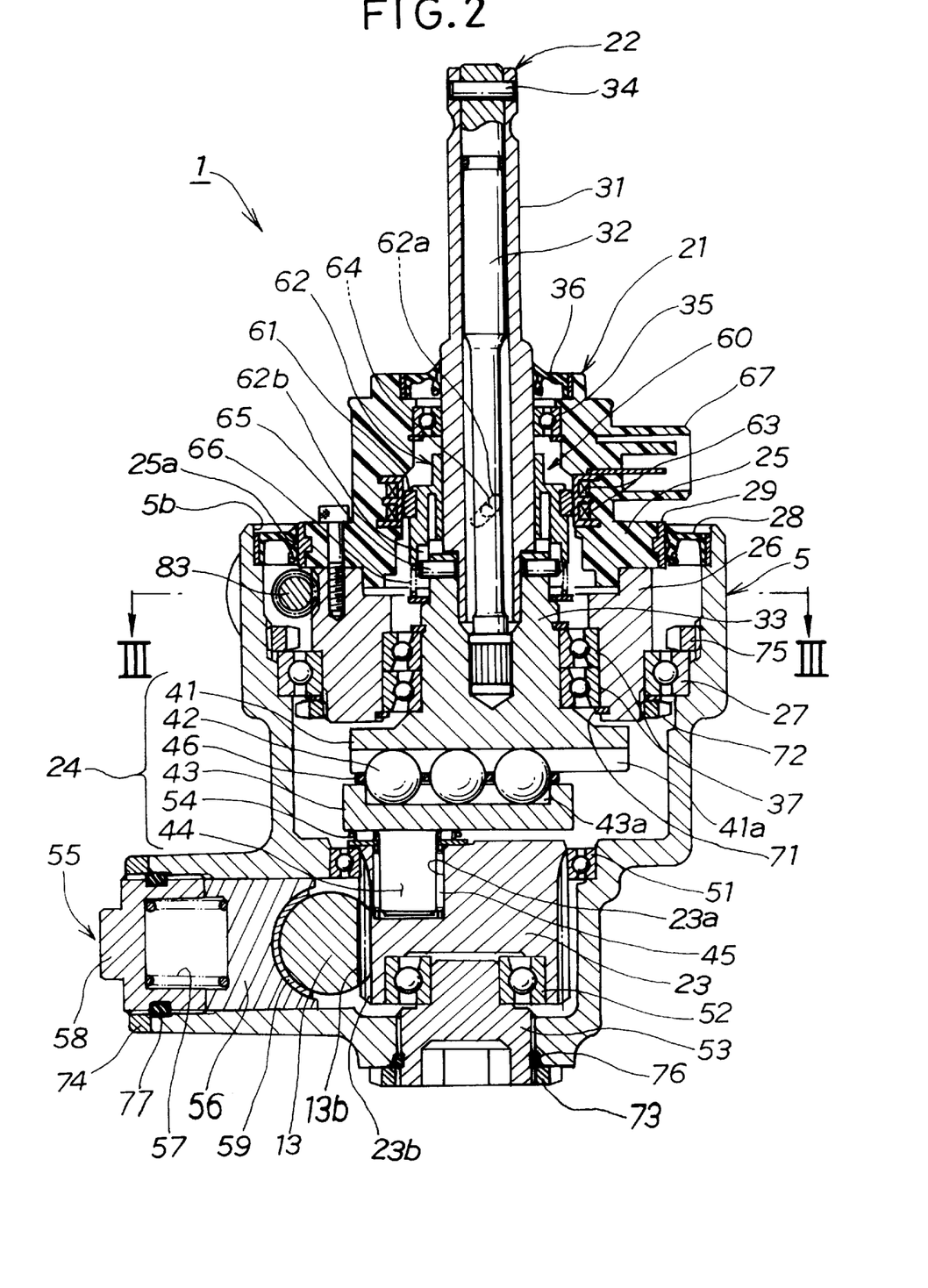
FIG. 2 is an enlarged cross-sectional view taken along the line II—II of FIG. 1.

As shown in FIG. 2, the steering device 1 generally comprises a movable housing 21 rotatably supported on the fixed housing 5 with a part of the movable housing 21 received in the fixed housing 5, an input shaft 22 rotatably and eccentrically mounted in the movable housing 21, an output shaft 23 rotatably mounted in the fixed housing 5 in eccentric relation to the input shaft 22, and a coupling 24 relatively non-rotatably connecting the input shaft 22 and the output shaft 23 while allowing them to move relatively to one another in a direction perpendicular to axes of the input and output shafts 22, 23 (this direction may be hereinafter referred to as "perpendicular direction").

The fixed housing 5 and the movable housing 21 jointly form a housing assembly of the steering device 1. The movable housing 21 is a generally hollow cylindrical composite housing which is composed of two annular housing members 25, 26 of different materials arranged concentrically in a vertical direction and bolted together end to end. The annular first (upper) movable housing member 25 is molded of synthetic resin, while the annular second (lower) movable housing member 26 is made of metal. The lower movable housing member 26 is entirely received in the fixed housing 5, while the upper movable housing member 25 is received in the fixed housing 5 only at its lower end portion.

The fixed housing 5 opens upwards and has a circular opening 5a at its upper end. The upper movable housing member 25 has a cylindrical outside surface 25a forming a seal surface. The lower movable housing member 26 has a cylindrical outside surface (not designated) forming a bearing retaining surface. The center of the circular opening 5a is aligned with an axis of rotation of the movable housing 21 (i.e., a common axis of rotation of the upper and lower movable housing members 25, 26). The lower movable housing member 26 is rotatably supported within the fixed housing 5 via a ball bearing 27 fitted between the cylindrical outside surface (bearing retaining surface) of the housing member 26 and a cylindrical inside surface (not designated) of the fixed housing 5. The cylindrical outside surface (seal surface) 25a of the upper movable housing member 25 is concentrically received in the circular opening 5a of the fixed housing 5 with an annular space defined between the upper movable housing member 25 and the fixed housing 5.

A seal member 28 comprised of a ring-like oil seal is disposed in the annular space so as to form a hermetic seal between the fixed housing 5 and the movable housing 21. The cylindrical outside surface 25a of the upper movable housing member 25 is subjected to frictional contact with the oil seal 28 and, hence, this surface 25a is preferably formed by a cylindrical outside surface of a low friction metal ring 29 which is molded integrally with an outer peripheral portion of the upper movable housing member 25 of synthetic resin. The low friction metal ring 29 is able to lower a frictional resistance between itself and the oil seal 28 and protect the synthetic resin upper housing member 25 against abrasive wear.

The input shaft 22 is a shaft connected to a steering wheel (not shown but identical to the one 101 shown in FIG. 8) via universal joints (not shown). The input shaft 22 is composed of a first shaft 31, a torsion bar (resilient member) 32, and a second shaft 33 joined together in the order named. More specifically, the first shaft 31 is a tubular shaft, and the torsion bar 32 is inserted in the tubular first shaft 31 and connected at its upper end to an upper end of the first shaft 31 by means of a pin 34. The lower end of the torsion bar 32 is firmly connected by serration to an upper end portion of the second shaft 22. The torsion bar 32 is a member which is capable of producing a twist angle exactly proportional to the steering torque and which allows the first shaft 31 and the second shaft 33 to create a relative torsional displacement therebetween.

The upper movable housing member 25 rotatably supports the first shaft 31 via a bearing 35. The coupling 24 is composed of a first (upper) coupling member 41 in the form of an elongated rectangular flange formed integrally with a lower end portion of the second shaft 33, a plurality (three in the illustrated embodiment) of steel balls 42, a second (lower) coupling member 43 in the form of an elongated rectangular plate and engaged with the first coupling member 41 via the steel balls 42, and a connecting shaft 44 extending downwardly from a lower surface of the second coupling member 43 in parallel relation to an axis of the second shaft 33. The upper coupling member 41 has a groove 41a of generally V-shaped cross section formed in a lower surface of the coupling member 41. Similarly, the lower coupling member 43 has a groove 43a of generally V-shaped cross section formed in an upper surface of the coupling member 43. The groove 43a of the lower coupling member 43 and the groove 41a of the upper coupling member 41 are arranged in confrontation with each other. The balls 42 are arranged in a row and rotatably supported at equal intervals on a plate-like ball retainer 46. The balls 42 thus supported on the bearing retainer 46 are slidably received in the grooves 41a, 43a of the upper and lower coupling members 41, 43. The groove 43a of the lower coupling member 43 is closed at opposite ends so as to limit movement of the balls 42 in a longitudinal direction of the groove 43a which is oriented in the same direction as the perpendicular direction specified above. The connecting shaft 44 is located on the lower coupling member 43 at a position off-centered from the axis of the second shaft 33 and rotatably received in an axial hole 23a in the output shaft 23 via a needle roller bearing 45. The axial hole 23a is eccentric to the axis of the output shaft 23.

The coupling 24 thus arranged engages with the second shaft 33 such that they are relatively non-rotatable but movable in the perpendicular direction. The coupling 24 also engages an eccentric portion of the output shaft 23 which is eccentric to the second shaft 33 such that they are relatively non-rotatable but movable in the perpendicular direction. In other words, the second shaft 33 and the output shaft 23 are connected together by the coupling 24 in such a manner that they are relatively non-rotatable but movable in the perpendicular direction.

The output shaft 23 is rotatably mounted in the fixed housing 5 via a ball bearing 51. The output shaft 23 has a lower end portion rotatably mounted by a roller bearing 52 on a thread-free stem (not designated) of an adjustment screw 53 threaded in a vertical threaded through-hole (not designated) formed in a lower end portion of the fixed housing 5. By turning the adjustment screw 53 in one direction, the bearing 52 is forced upwardly with a proper upward thrusting force. The upward thrusting force is transmitted to the fixed housing 5 successively through the output shaft 23, a thrust roller bearing 54 (disposed between the output shaft 23 and the lower coupling member 43), the lower coupling member 43, the balls 42, the upper coupling member 41, the second shaft 33, duplex ball bearings 37, 37, the lower movable housing member 26, a lock nut 72 (securing an inner race of the ball bearing 27 to the lower movable housing member 27), the ball bearing 27, and a ring-shaped lock bolt 75 (securing an outer race of the ball bearing 27 to the fixed housing 5), and so an excess gap existing between each pair of adjacent ones of these parts can be eliminated. Thus, by adjusting the position of only one adjustment screw 53, all of the related parts can readily be set in an appropriate operating condition.

An outer peripheral surface of the output shaft 23 is toothed to form a pinion 23b which is one part of the rack-and-pinion mechanism 2 (FIG. 1). The pinion 23b is held in mesh with rack 13b toothed on one side of the rack shaft 13.

The fixed housing 5 is provided with a rack guide 55. The rack guide 55 is composed of a guide member 56 supporting and guiding an arcuate surface of the rack shaft 13 from a side opposite to the rack 13b, and an adjustment screw 58 for forcing the guide member 56 toward the rack shaft 13 via a compression spring 57 acting between the guide member 57 and the adjustment screw 58. The adjustment screw 58 is threaded in a horizontal threaded hole (not designated) formed in one side of the fixed housing 5. By turning the adjustment screw 58 in one direction, the guide member 56 is forced against the rack shaft 13 with an appropriate preloading force applied from the compression spring 57 to the rack 13. With this preloading, the rack 13b and the pinion 23b are held in appropriate meshing engagement with each other. In FIG. 2, reference numeral 59 denotes a guard member provided between the guide member 56 and the rack shaft 13.

A combination of the input shaft 22, coupling 24 and rack shaft 13 constitutes an important part of the steering system of the vehicle. It is to be noted that the orientation of the coupling 24 relative to the input shaft 22 and the output shaft 23 shown in FIG. 2 is given only for illustrative purposes, and the actual orientation of the coupling 24 is 90 degrees out of phase with the illustrated orientation with respect to the axis of the input shaft 22. The grooves 41a, 43a of the upper and lower coupling members 41, 43 extend parallel to an axis of a worm shaft 83 described later. Further description of the orientation of the coupling 24 will be made with reference to FIG. 4.

As described above, the steering device 1 is constructed such that a steering torque sensor 60 is assembled integrally with the steering device 1. The steering torque sensor 60 is arranged to detect a steering torque of the steering system by detecting a relative torsional displacement between the first and second shafts 31, 33 interconnected by the torsion bar 32.

In the illustrated embodiment, the steering torque sensor 60 is a non-contacting steering sensor (variable inductance sensor) composed of a core 61, a slider 62 carrying thereon the core 61 and engaged with both the first and second shafts 31, 33 so that the slider 62 is movable in an axial direction of the input and output shafts 31, 33 in proportion to the amount of relative torsional displacement between the input and output shafts 31, 33, and a coil 63 mounted on the movable housing 21 for converting the amount of axial displacement of the slider 62 (equal to the amount of axial displacement of the core 61) into an electric signal. The coil 63 is preferably formed as an insert which is embedded or integrally molded in the movable housing 21 when the movable housing 21 is molded. With this integral molding, the coil 63 and the steering torque sensor 60 as a whole can be assembled easily and less costly.

The slider 62 is in the form of a hollow cylindrical sleeve slidably fitted around a lower portion of the first shaft 31 and an upper portion of the second shaft 33. The slider 62 has a helical groove 62a and an axial straight groove 62b. The helical groove 62a slidably receives therein a pin 64 attached to the first shaft 31, while the straight groove 62b slidably receives a pin 65 attached to the second shaft 33. With this arrangement, the slider 62 is displaceable in the axial direction in response to the relative torsional displacement between the first and second shafts 31, 33. The slider 62 is urged upwardly by the force of a compression spring 66 acting between the second shaft 33 and the slider 62. The steering torque sensor 60 is electrically connected to a control unit (not shown but identical to the one 105 shown in FIG. 8) via a connector 67 containing terminals (not designated) of the coil 63 so that an electric signal corresponding to the detected steering torque can be supplied from the steering torque sensor 60 to the control unit.

In FIG. 2, reference numeral 71 denotes a snap ring used for securing outer races of the duplex ball bearings 37, 37 to the lower movable housing 26; 73, a lock nut for securing the adjustment screw 58 to the fixed housing 5; 76, an O-ring disposed between the adjustment screw 53 and the fixed housing 5 to form a hermetic seal therebetween; and 77, an O-ring providing a hermetic seal between the adjustment screw 58 and the fixed housing 5.

Figure 3:
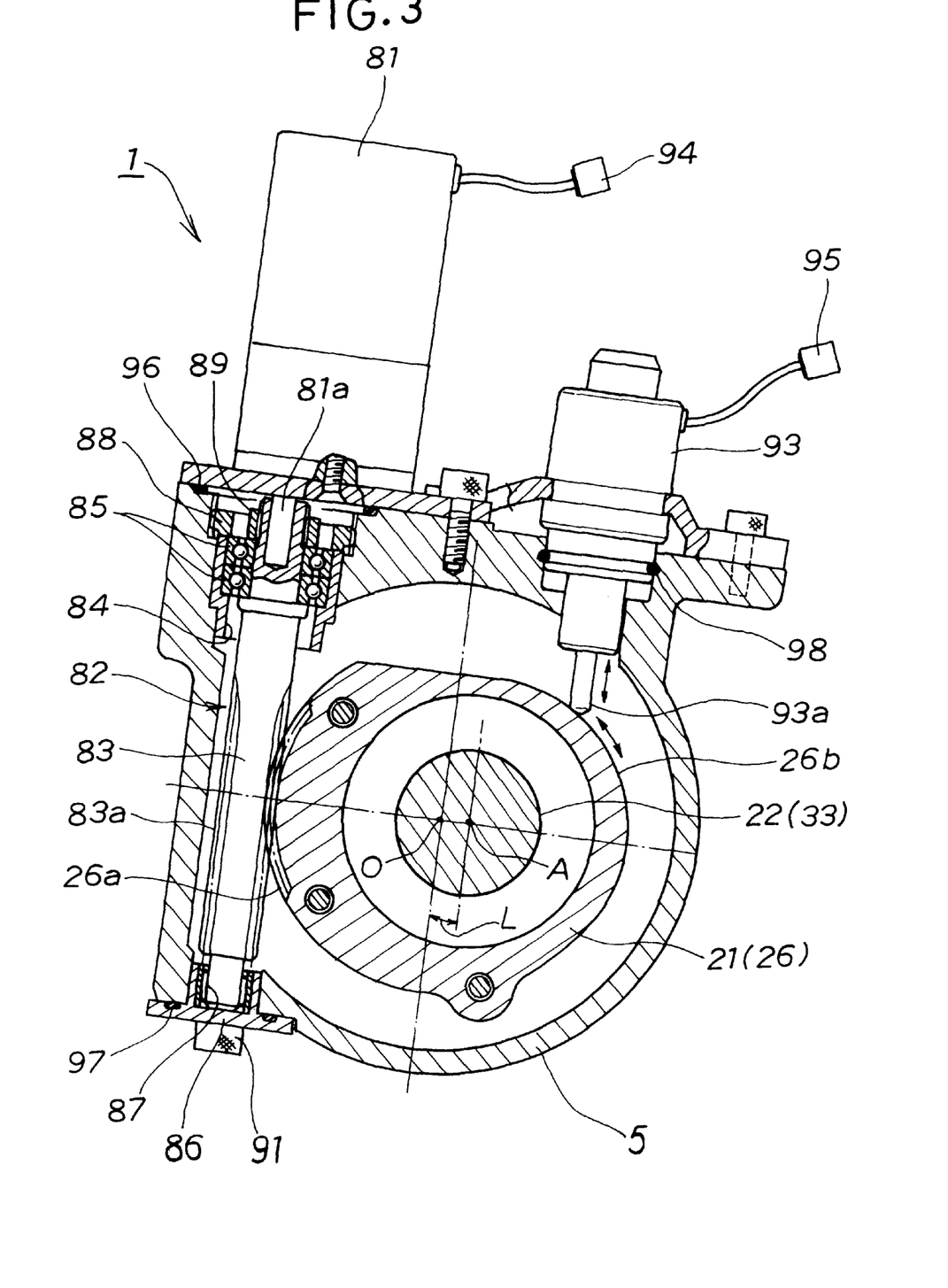
FIG. 3 is a cross-sectional view taken along the line III—III of FIG. 2.

As shown in FIG. 3, the axis A of rotation of the input shaft 22 (second shaft 33) is eccentric to, or off-centered from, the axis O of rotation of the movable housing 21 by a distance L, in a direction perpendicular to an axis of the worm shaft 83 and away from the worm shaft 83. In FIG. 3, only the second shaft 33 of the input shaft 22 is shown, and the torsion bar 32 and the steering torque sensor 60 are omitted for illustrative purposes.

The steering device 1 further includes an electric motor 81 as a drive means for the control of the steering ratio of the steering device 1, and a worm gear mechanism 82 driven by the electric motor 81. By turning the movable housing 21 via the worm gear mechanism 82, the axis A of the input shaft 22 is displaced to thereby vary the steering ratio of the steering device 1.

The electric motor 81 is a geared motor bolted to the fixed housing 5. The worm gear mechanism 82 is composed of a worm shaft connected to an output shaft 81a of the electric motor 81, and a worm wheel 26a meshing with a worm gear 83a toothed on the worm shaft 83. The worm wheel 26a is formed by a plurality of gear teeth toothed on a portion of the outer peripheral surface of the lower movable housing member 26. Because the lower movable housing member 26 is made of metal, the worm wheel 26a has good durability.

The worm shaft 83 has one end (an end connected to the output shaft 81a of the electric motor 81) supported on the fixed housing via a hollow eccentric sleeve 84 and duplex ball bearings 85. The other end of the worm wheel 83 is supported on the fixed housing 5 via a bracket 86 and a needle roller bearing 87. The hollow eccentric sleeve 84 is a tubular sleeve rotatably inserted in an end portion (upper end portion in FIG. 3) of a horizontal hole (not designated) formed in the fixed housing 5. The tubular sleeve 84 has a longitudinal hole (eccentric hole) which is eccentric to, or off-centered from, an axis of rotation of the tubular sleeve 84. The above-mentioned one end of the worm shaft 83 is rotatably received in the eccentric hole via the duplex ball bearings 85. The hollow eccentric sleeve 84 is forced in an axil direction by a ring-shaped lock bolt 88 and frictionally engaged with the fixed housing 5 by the force of a friction acting between the hollow eccentric sleeve 84 and the fixed housing 5. The bracket 86 is fitted in the other end portion (lower end portion in FIG. 3) of the horizontal hole in the fixed housing 5, with a slight clearance (of the order of several tens μm) defined between the bracket 86 and the fixed housing 5. The bracket 86 is firmly secured to the housing 8 by a lock screw 91. The needle roller bearing 87 is held in the bracket 86 and rotatably supports the above-mentioned other end of the worm shaft 83. In FIG. 3, reference numeral 89 designates a lock nut used for securing inner races of the duplex ball bearings 85 to the worm shaft 83.

Meshing engagement between the worm 83a and worm wheel 26a of the worm gear mechanism 82 is adjusted in the manner described below.

At first, the electric motor 81 and the ring-shaped lock bolt 88 are removed from the fixed housing 5. Then, the lock screw 91 is loosened to such an extent that the worm shaft 83 becomes displaceable at an end adjacent to the bracket 86.

Subsequently, the hollow eccentric sleeve 84 is gradually turned by means of a tool (not shown). In this instance, since the eccentric hole of the hollow eccentric sleeve 84 is off-centered from the axis of rotation of the hollow eccentric sleeve 84, angular movement of the hollow eccentric sleeve 84 causes the axis of the worm shaft 83 to displace in a transverse direction toward and away from the worm wheel 26a. With this displacement of the worm shaft 83, an excessive play (backlash) between the worm 83a and the worm wheel 26a can be eliminated. The meshing engagement between the worm 83a and the worm wheel 26a is thus adjusted.

Thereafter, the ring-shaped lock bolt 88 and the lock screws 91 are tightly fastened, and the electric motor 81 is mounted again on a predetermined portion of the fixed housing 5. The meshing engagement adjustment work is thus completed.

The steering device 1 further has a displacement sensor 93 attached to the fixed housing 5 for detecting the amount of displacement of the input shaft 22. The displacement sensor 93 is arranged to detect the amount of displacement of a cam surface 26b formed on the outer peripheral surface of the lower movable housing member 26, thereby indirectly detecting the amount of displacement of the axis A of the input shaft.

The displacement sensor 93 is a generally used potentiometer including a slider or tap (not shown) movable in response to axial reciprocating movement of a rod-like prove 93a held in sliding contact with the cam surface 26b, and a resistor plate (not shown) along which the tap can be moved. The angle of rotation (rotational angle) of the lower movable housing member 26 corresponds to the amount of displacement of the axis A of the input shaft 22, and the amount of displacement of the axis A of the input shaft 22 corresponds to the amount of displacement of the cam surface 26b. Accordingly, by detecting the amount of displacement of the cam surface 26b by means of the displacement sensor 93, the amount of displacement of the axis A of the input shaft 22 can be obtained with accuracy.

Thus, a displacement of the cam surface 26b of the lower movable housing member 26 causes the prove 93a to move forward or backward. In response to advancing movement or retracting movement of the prove 93a, the slider (tap) slides along the resistor plate to thereby generates an electric signal having an intensity which varies with a change in resistance of the resistor plate. The thus generated electric signal represents the amount of displacement of the input shaft 22. Because the amount of sliding movement of the slider is relatively small, the slider and the resistor plate are not susceptible to abrasive ware. The displacement sensor 93 can, therefore, maintain a desired degree of accuracy over a prolonged period of use and ensures a stable control of the steering ratio.

In FIG. 3, reference numerals 94 and 95 denote couplers used for electrically connecting the electric motor 81 and the displacement sensor 93, respectively, to the control unit (see the control unit 105 shown in FIG. 8); 96, an O-ring forming a hermetic seal between the electric motor 81 and the fixed housing 5; 97, an O-ring forming a hermetic seal between the bracket 86 and the fixed housing 5; and 98, an O-ring forming a hermetic seal between the displacement sensor 93 and the fixed housing 5.

Figure 4:
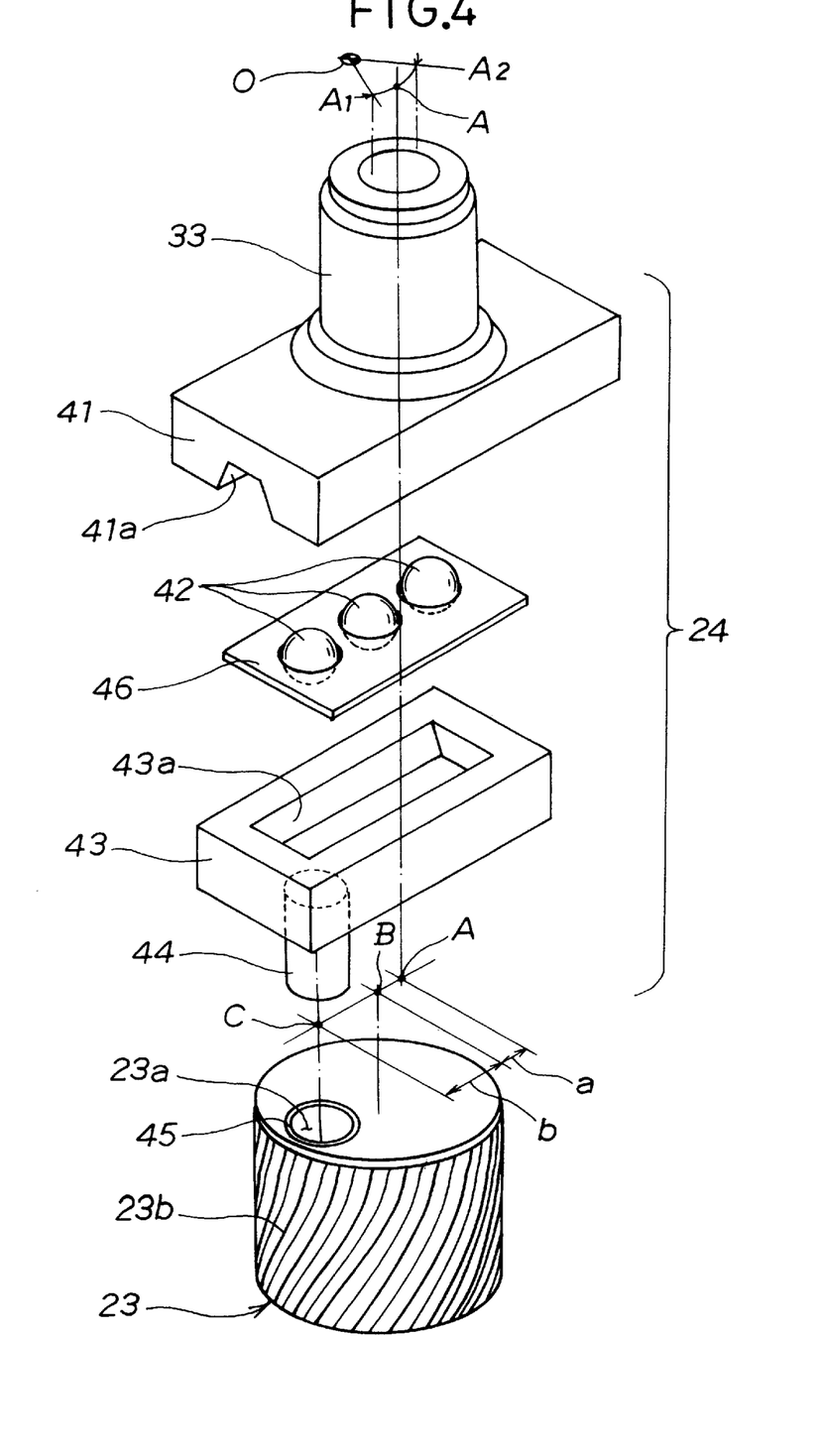
FIG. 4 is an exploded perspective view showing the relationship between a second shaft, a coupling and an output shaft of the steering device.

FIG. 4 shows, in exploded perspective, the positional relationship between the second shaft 33, coupling 24 and output shaft 23. As shown in this figure, the second shaft 33 engages the coupling such that they are relatively movable in the perpendicular direction (i.e., the direction perpendicular to the axis of the second shaft 23). The axis B of rotation of the output shaft 23 is eccentric to, or off-centered from, the axis A of rotation of the second shaft 33 in a direction of relative movement between the second shaft 33 and the coupling 24. The axial hole 23a of the output shaft 23 is located at a position C which is eccentric to, or off-centered from, the axis B of rotation of the output shaft 23 in the direction of relative movement of between the second shaft 33 and the coupling 24. The axial hole 23a rotatably receives therein the connecting shaft 44 of the coupling 24. In the illustrated arrangement, the axis A of rotation of the second shaft 33, the axis B of rotation of the output shaft 23, and an axis (operating point) C of the connecting shaft 44 are arranged in a row along the direction of relative movement between the second shaft 33 and the coupling 24. For the purpose of illustration, FIG. 4 shows the positions of the components 44, 44, 23 which are achieved when the second shaft 33 and the output shaft 23 are turned from their neutral positions through an angle of 180 degrees.

Figure 5:
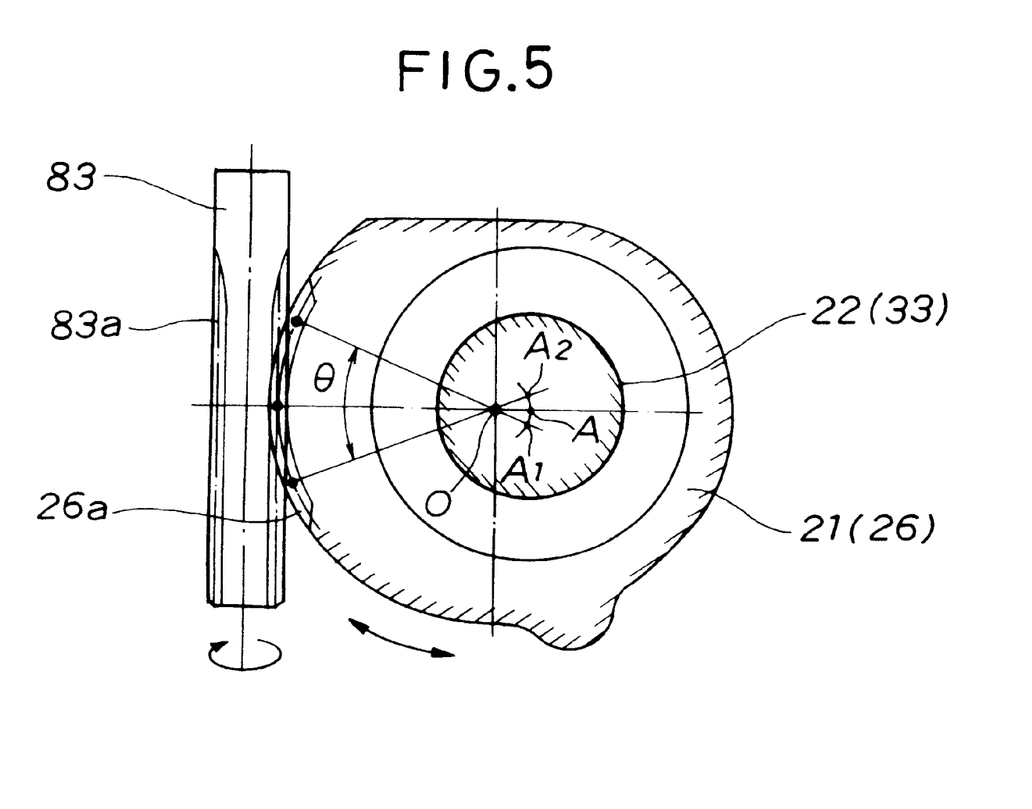
FIG. 5 is a schematic cross-sectional view showing the positional relationship between a worm gear mechanism, a movable housing and the second shaft.

As shown in FIG. 5, by turning the worm 83a in the forward and reverse directions, the lower movable housing member 26 is turned about its axis O of rotation within an angular range of θ degrees. In this instance, due to the eccentricity between the axis A of rotation of the second shaft 33 and the axis O of rotation of the lower movable housing member 26, the axis A of rotation of the second shaft 33 is displaced within an angular range extending between the position A1 and the position A2. The axis B of rotation of the output shaft 23 is fixed in position and hence is not displaceable.

Figure 6:
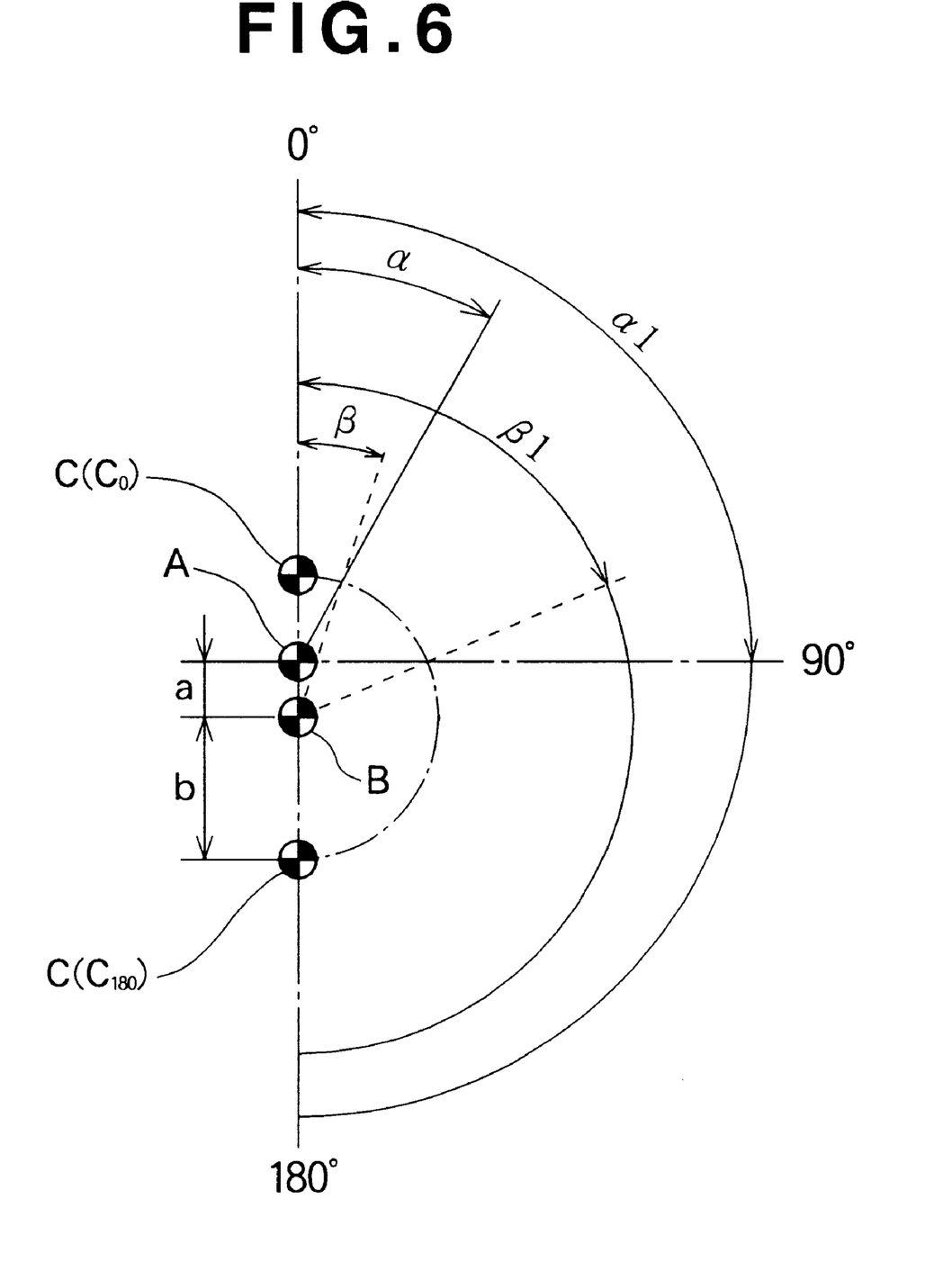
FIG. 6 is a diagrammatical view illustrative of the principle of operation of the steering device.

FIG. 6 illustrates the principle of operation of the steering device 1 shown in conjunction with the positional relationship between the axis A of rotation of the second shaft 33, the axis B of rotation of the output shaft 23, and the axis (operating point) C of the connecting shaft 44. In FIG. 6, if the distance (eccentricity) between the axis A of rotation of the second shaft 33 and the axis B of rotation of the output shaft 23 is represented by a, the distance between the axis B of rotation of the output shaft 23 and the axis (operating point) C of the connecting shaft 44 is represented by b, the angle of rotation (rotational angle) of the second shaft 33 (which is equal to the angle of rotation of the steering wheel) is represented by $\alpha$, and the angle of rotation (rotational angle) of the output shaft 23 (which is equal to the angle of rotation of the pinion 23a) is represented by $\beta$, we can obtain the following equation.

$$b \cdot \sin\beta = (b \cdot \cos\beta - a)\tan\alpha$$

Therefore, the rotational angle $\alpha$ of the second shaft 33 is indicated by the following equation.

$$\alpha = \tan^{-1}((b \cdot \sin\beta)/((b \cdot \cos\beta - a)))$$

Thus, as shown in FIG. 6, when the rotational angle of the second shaft 33 is $\alpha$, the rotational angle of the output shaft 23 becomes $\beta$. Similarly, when the rotational angle of the second shaft 33 increases to $\alpha1$, the rotational angle of the output shaft 23 becomes $\beta1$.

Operation of the steering device 1 will be described with reference to FIGS. 4 through 7.

When the second shaft 33 shown in FIG. 4 is turned in one direction, the balls 42 of the coupling 24 force the connecting shaft 44 to revolve like a crank about the axis B of the output shaft 23 from the position $C_0$ (FIG. 6) toward the position $C_{180}$ (FIG. 6). With this movement of the connecting shaft 44, rotation of the second shaft 33 is transmitted to the output shaft 23, thereby rotating the output shaft 23. In this instance, if the lower movable housing member 26 shown in FIG. 5 is angularly moved or turned, the second axis A of the second shaft 33 will be displaced within the angular range A1–A2 by virtue of an eccentric cam action of the lower movable housing member 26. Accordingly, by displacing the axis A of rotation of the second shaft 33 to change the distance a (FIG. 6) between the axis A of rotation of the second shaft 33 and the axis B of rotation of the output shaft 23 to such an extent to place the second shaft 33 and the output shaft 23 in an eccentric condition, the rotational angle of the second shaft 33 and the rotational angle of the output shaft 23 do not match each other. In addition, when the second shaft 33 is turned at equal angular intervals, the rotational angle of the output shaft 23 varies with increments increasing progressively as the rotational angle of the second shaft 33 increases (see, a curve $a_1$ indicated by a thick solid line shown in FIG. 7, and a curve $a_2$ indicated by a thin solid line shown in FIG. 7).

Figure 7:
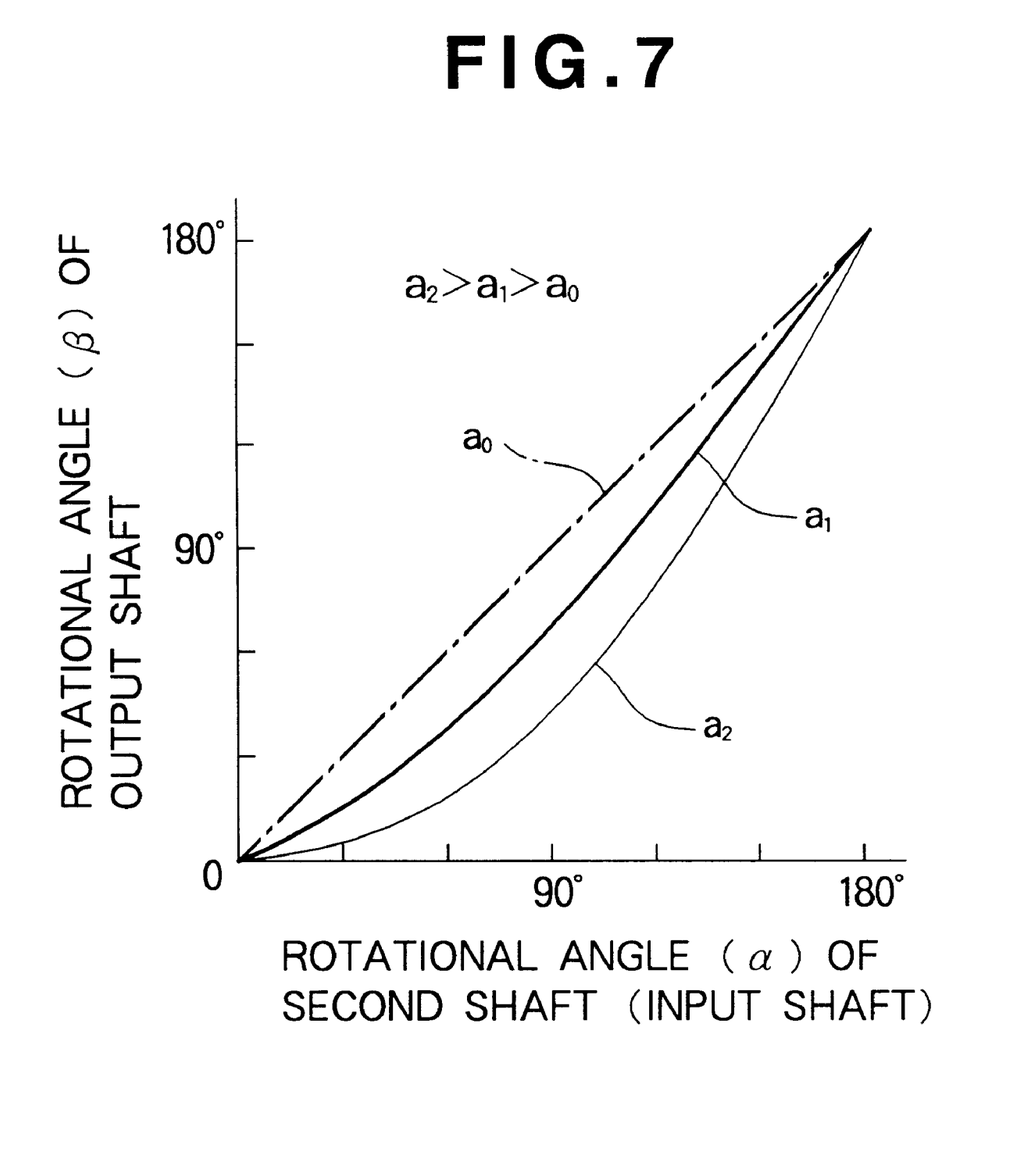
FIG. 7 is a graph showing performance curves of the steering device.

It appears from FIG. 7 that by continuously changing the distance (eccentricity) a between the second shaft 33 and the output shaft 23 within the angular range $a_2$–$a_0$ ($a_2 > a_1 > a_0$), the ratio of the rotational angle $\alpha$ of the second shaft 33 to the rotational angle $\beta$ of the output shaft 23, namely, the steering ratio can be varied continuously. When the eccentricity is equal to zero ($a_0=0$), the steering ratio becomes constant as indicated by the phantom line $a_0$ shown in FIG. 7. In order to exhibit an optimum steering performance, the position of the axis A of the second shaft 33 is preferably controlled in such a manner that in a low vehicle velocity range, the distance (eccentricity) a is reduced as gradually approaching the zero side ($a=a_0$), whereas in a high vehicle velocity range, the distance (eccentricity) a is increased as gradually approaching the $a_2$ side ($a=a_2$).

The steering device 1 and the steering torque sensor 60 can be assembled together into a unitary construction for the reasons described below with reference to FIG. 2.

The input shaft 22 which is composed of three components (first shaft 31, torsion bar 32 and second shaft 33) disposed concentrically and connected together in the order named is rotatably mounted in the movable housing 21 in eccentric relation to the movable housing 21. Accordingly, rotation of the movable housing 21 causes the axes of the first and second shafts 31, 33 to displace concurrently in a transverse direction. In addition, because the torsion bar 32 is a structural member which is capable of producing a twist angle exactly proportional to the steering torque and which allows the first shaft 31 and the second shaft 33 to create a relative torsional displacement therebetween which is proportional in amount to the magnitude of a steering torque of the steering system, the steering torque sensor 60 is simply required to detect the relative torsional displacement between the first shaft 31 and the second shaft 33. The steering torque sensor 60 of the present invention is a non-contacting steering torque sensor (variable inductance displacement sensor) which, as described above, is composed of the slider 62 engaged with the first and second shafts 31, 33 and displaceable in the axial direction in response to the relative torsional displacement between the first shaft 31 and the second shaft 33, and the coil 63 mounted on the movable housing 21 in concentric relation to the slider 32 (and the first shaft 31) so as to convert the amount of displacement of the slider 62 (or the core 61 carried on the slider 62). The first shaft 31, torsion bar 32 and second shaft 33 together are displaced in a lateral direction as the movable housing 21 rotates. However, since the coil 63 of the steering torque sensor 60 is concentrically attached to the movable housing 21, the steering torque sensor 60 can be assembled integrally with the steering device 1 around the input shaft 22, regardless of the lateral displacement of the input shaft 22.

One preferred structural embodiment of the present invention has been described. It is possible according to the invention to form the movable housing 21 as a single component in which the upper and lower movable housing members 25, 26 are formed integrally with each other. The coupling 24 may have a different design or arrangement provided that the coupling engages the input shaft 22 in such a manner as to prevent relative rotational movement between itself and the input shaft 22 while allowing relative movement in a direction perpendicular to the axis of the input shaft 22, and the coupling 24 rotatably engages an eccentric portion of the output shaft 23 disposed eccentrically with the input shaft 22. The seal member 28 provided to form a hermetic seal between the fixed housing and the movable housing 21 should by no means be limited to the oil seal.

As described above, a steering device having a variable steering ratio according to the present invention has an input shaft composed of a first shaft, a torsion bar, and a second shaft disposed concentrically and connected together in the order named. Since the input shaft is rotatably mounted in a movable housing in eccentric relation to an axis of rotation of the movable housing, the first and second shafts are displaced concurrently in a lateral direction as the movable housing rotates. Because the torsion bar is a member which is capable of producing a twist angle exactly proportional to the steering torque and which allows the first shaft and the second shaft to create a relative torsional displacement therebetween, the steering torque sensor is simply required to detect the relative torsional displacement between the first shaft and the second shaft. The steering torque sensor of the present invention is a non-contacting steering torque sensor and has a slider engaged with the first and second shafts and displaceable in the axial direction in response to the relative torsional displacement between the first and second shafts, and a coil for converting the relative torsional displacement into an electric signal. Rotation of the movable housing causes the input shaft (first shaft, torsion bar and second shaft) to displaced in the lateral direction, however, since the coil of the steering torque sensor is attached to the movable housing in concentric relation thereto, the steering torque sensor can be assembled integrally with the steering device around the input shaft.

The steering device and the steering torque sensor integrally assembled together provide various advantages, as enumerated below.

(1) The test process is simple and can be performed in a relatively short time because a performance test of the steering device is achievable at the same time as the performance test of the steering torque sensor.

(2) Assembling operation is simple and highly efficient because an assembling operation carried out to assemble the steering device to the vehicle body automatically completes assembling of the steering torque sensor to the vehicle body. The integrated structure of the steering device and the steering torque sensor enables the use of a single set of harnesses which is easy to arrange or wire and highly resistant to damage.

(3) By removing at least the slider, the arrangement (structural components) around the steering shaft becomes available also for a steering device of the type not equipped with a steering torque sensor. This arrangement is, therefore, contributive to the reduction in number and cost of the parts used.

Obviously, various minor changes and modifications of the present invention are possible in the light of the above teaching. It is therefore to be understood that within the scope of the appended claims the invention may be practiced otherwise than as specifically described.

What is claimed is:

1. An electric power steering apparatus for a vehicle, comprising:

a steering torque sensor for detecting a steering torque of a steering system arranged from a steering wheel to steerable wheels of the vehicle and generating an electric signal indicative of the detected steering torque;

an electric motor for generating an assist torque on the basis of said electric signal and providing the assist torque to said steering system;

a steering device having a variable steering ratio represented by the number of degrees that said steering wheel requires to pivot said steerable wheels one degree;

said steering device including (i) a housing assembly composed of a fixed housing and a movable housing rotatably supported on said fixed housing, (ii) an input shaft operatively connected to said steering wheel and rotatably mounted in said movable housing in eccentric relation to said movable housing, (iii) an output shaft operatively connected to said steerable wheels and rotatably mounted in said fixed housing in eccentric relation to said input shaft, (iv) a coupling relatively non-rotatably connecting said input shaft and said output shaft while allowing them to move relatively to one another in a direction perpendicular to axes of said input and output shafts, and (v) drive means for rotating said movable housing relative to said fixed housing to displace the axis of said input shaft relatively to an axis of rotation of said movable housing so that the eccentricity between said input shaft and said output shaft changes to vary the steering ratio of said steering device;

said input shaft including a first shaft connected to said steering wheel, a second shaft connected to said output shaft via said coupling, and a torsion bar interconnecting said first and second shafts while allowing them to create a relative torsional displacement therebetween; and said steering torque sensor including a slider movably engaged with said first and second shafts and displaceable in an axial direction in response to the relative torsional displacement between said first and second shafts, and a coil mounted on said movable housing for converting the amount of axial displacement of said slider into a corresponding electric signal.

2. An electric power steering apparatus according to claim 1, wherein said fixed housing has a circular opening, and said movable housing has a cylindrical outside surface received in said circular opening with an annular space defined between said fixed housing and said movable housing, further including a seal member disposed in said annular space to form a hermetic seal between said fixed housing and said movable housing.

3. An electric power steering apparatus according to claim 2, wherein said movable housing includes a substantially annular member molded of synthetic resin, and a low friction metal ring molded integrally with an outer peripheral surface of said annular member and forming said cylindrical outside surface of said movable housing.

4. An electric power steering apparatus according to claim 1, wherein said drive means comprises a worm gear mechanism composed of a worm gear and a worm wheel rotatably driven by said worm gear, wherein said movable housing is a composite movable housing composed of a substantially annular first movable housing member of synthetic resin and a substantially annular second movable housing member of metal connected end to end with said annular first movable housing member in concentric relation to the latter, and wherein said worm wheel is toothed on a cylindrical outside surface of said second movable housing member, and said coil of said steering torque sensor is molded concentrically and integrally with said first movable housing member.

5. An electric power steering apparatus according to claim 4, wherein said fixed housing has a circular opening, said second movable housing member is entirely received in said fixed housing, and said first movable housing member has an axial portion received in said circular opening of said fixed housing so as to define an annular space between said first movable housing member and said fixed housing, further including an annular seal member disposed in said annular space to form a hermetic seal between said fixed housing and said first movable housing member.

6. An electric power steering apparatus according to claim 5, wherein said axial portion of said first movable housing member includes a low friction metal ring molded integrally with a cylindrical outside surface of said annular first movable housing member.

7. An electric power steering apparatus according to claim 1, wherein said output shaft has an axial hole eccentric with the axis of said output shaft, and wherein said coupling includes a first coupling member formed integrally with said second shaft and having a first groove of V-shaped cross section extending along said direction, a connecting shaft rotatably received in said axial hole in said first coupling member, a second coupling member formed integrally with an end of said connecting shaft and having a second groove of V-shaped cross section extending in confrontation with said first groove, and a plurality of balls slidably received in said first and second grooves to couple said first and second coupling members while allowing them to move relatively to one another in said direction.

* * * * *